(12) United States Patent  
Padmanabhan et al.

(10) Patent No.: US 9,056,292 B2  
(45) Date of Patent: Jun. 16, 2015

(54) BARREL ALIGNMENT IN EXTRUDER SYSTEMS

(75) Inventors: Babu Padmanabhan, Bangalore (IN); Arunajatai Viswanathan, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 1189 days.

(21) Appl. No.: 12/884,774

(22) Filed: Sep. 17, 2010

(65) Prior Publication Data

US 2011/0069576 A1    Mar. 24, 2011

(30) Foreign Application Priority Data

Sep. 18, 2009    (IN) .......................... 2274/CHE/2009

(51) Int. Cl.
*B29B 7/48* (2006.01)
*B01F 15/00* (2006.01)
*B29B 7/58* (2006.01)
*B29C 47/08* (2006.01)
*B29C 47/00* (2006.01)
*B29C 47/66* (2006.01)
*B29C 47/40* (2006.01)

(52) U.S. Cl.
CPC ............. B01F 15/00928 (2013.01); B29B 7/48 (2013.01); B29B 7/58 (2013.01); *B29C 47/0009* (2013.01); B29C 47/0847 (2013.01); *B29C 47/662* (2013.01); *B29C 47/0827* (2013.01); *B29C 47/0864* (2013.01); *B29C 47/0867* (2013.01); *B29C 47/40* (2013.01)

(58) Field of Classification Search
CPC ................................ B29B 7/428; B29B 7/488
USPC .......... 366/79, 84, 85; 285/405, 460, 412, 413
See application file for complete search history.

(56) References Cited

U.S. PATENT DOCUMENTS

| 245,403 | A | * | 8/1881 | Harris | ........................... 285/405 |
|---|---|---|---|---|---|
| 794,764 | A | * | 7/1905 | Boyd | ............................. 285/412 |
| 904,200 | A | * | 11/1908 | Scott | ............................. 285/396 |
| 913,685 | A | * | 3/1909 | Wolf | ............................. 285/382 |
| 3,141,686 | A | * | 7/1964 | Smith | ............................ 277/608 |
| 4,640,672 | A | * | 2/1987 | Ellwood | ..................... 425/192 R |

* cited by examiner

*Primary Examiner* — David Sorkin (74) *Attorney, Agent, or Firm* — Klarquist Sparkman, LLP (57) ABSTRACT

A barrel alignment structure for a pair of barrel sections each defining an end surface configured to abut each other is disclosed. The barrel alignment structure comprises of a plurality of alignment pins distributed on the end surface of the first barrel section. The barrel alignment structure further comprises of a corresponding number of slots defined on the end surface of the second barrel section, each slot configured to receive one alignment pin, wherein the slot has a width substantially equal to that of the alignment pin and a length larger than the width of the alignment pin permitting relative thermal expansion between the pair of barrel sections. An extruder barrel section is also disclosed. The extruder barrel section defining an end surface configured to abut the end surface of another extruder barrel section. The extruder barrel section comprises of a plurality of alignment pins distributed on its end surface. Each alignment pin configured to be received by a corresponding slot defined on the end surface of the extruder barrel section abutting it, wherein the slot has a width substantially equal to that of the alignment pin and a length larger than the width of the alignment pin permitting relative thermal expansion between the pair of barrel sections.

9 Claims, 8 Drawing Sheets

BARREL ALIGNMENT IN EXTRUDER SYSTEMS

TECHNICAL FIELD

This disclosure relates generally to the field of screw extruders. More particularly, this disclosure relates to design of barrel sections in a screw extruder assembly.

BACKGROUND

Barrels are widely used in several engineering applications and mechanical systems. One such mechanical system, which employs a barrel, is a twin-screw extruder. In a typical twin-screw extruder, the barrel has a central bore in a shape of two horizontally intersecting circles. The barrel houses a pair of extruder screw shafts with extruder screw elements mounted on each of extruder screw shafts.

Each of the pair of extruder screw shafts, having the extruder screw elements mounted on the screw shafts rotates to process the work material. The motion of the screw shafts and unequal loading of different barrel sections may cause jerks and random forces may lead to misalignment of barrel sections. Hence, it becomes necessary that centers of the barrel sections should match with those of the twin screws during the rotation of the screw shafts for smooth extrusion.

Further, various processes like conveying, kneading, mixing, devolatizing etc occur at different barrel sections at different temperatures. As a result, the temperature distribution along the barrel is non-uniform. Hence, the barrel sections undergo differential thermal expansion. Due to this differential thermal expansion, misalignment of barrel sections may take place. Hence, it is desirable to have a barrel assembly, which ensures alignment of different barrel sections notwithstanding the adverse temperature differences.

Various systems have been proposed to maintain the alignment of barrel section. However, these systems were only partially successful in addressing the misalignment problems. In the conventional mechanical systems, bolts are used to join the barrel sections. Although bolt joints solve the problem of misalignment due to uneven forces to a certain extent, such joints do not allow for thermal expansion of barrel sections. This constrained thermal expansion may lead to deformation of barrel sections resulting in misalignment of the barrel sections.

In another conventional system, long bars are passed through bores in the flanges of barrel sections. However, again this arrangement has problems in terms of constrained thermal expansion. This arrangement may also lead to residual stresses in the material of the barrel sections. Hence, there is a need for a barrel assembly in which the alignment of barrel sections is ensured under all thermal conditions. It is also desirable to have a barrel assembly in which the alignment of the barrel sections withstands unequal force distribution. It is further desirable to have a barrel assembly in which the alignment is ensured without formation of stresses.

SUMMARY OF THE DISCLOSURE

In one example, a barrel alignment structure for a pair of barrel sections each defining an end surface configured to abut each other is disclosed. The barrel alignment structure comprises of a plurality of alignment pins distributed on the end surface of the first barrel section. The barrel alignment structure further comprises of a corresponding number of slots defined on the end surface of the second barrel section, each slot configured to receive one alignment pin, wherein the slot has a width substantially equal to that of the alignment pin and a length larger than the width of the alignment pin permitting relative thermal expansion between the pair of barrel sections.

An extruder barrel section is also disclosed. The extruder barrel section defining an end surface configured to abut the end surface of another extruder barrel section. The extruder barrel section comprises of a plurality of alignment pins distributed on its end surface. Each alignment pin configured to be received by a corresponding slot defined on the end surface of the extruder barrel section abutting it, wherein the slot has a width equal to that of the alignment pin and a length larger than the width of the alignment pin permitting relative thermal expansion between the pair of barrel sections.

A method of aligning a pair of barrel sections is also disclosed. The pair of barrel sections each defining an end surface configured to abut each other. The method comprises providing a plurality of alignment pins distributed on the end surface of the first barrel section and defines a corresponding number of slots on the end surface of the second barrel section. Each slot configured to receive one alignment pin, wherein the slot has a width equal to that of the alignment pin and a length larger than the width of the alignment pin.

DETAILED DESCRIPTION

Definitions

Twin screw extruder: Twin screw extruders are systems used for processing material such as thermoplastic, thermoset and the like. The processing of work material is performed by a pair of extruder screw shafts. The extruder screw shafts are housed in a barrel formed by joining plurality of barrel sections with their axes aligned. Each barrel section has a bore formed by intersection of two circular parallel bores.

Barrel Section: A barrel section is a part of the complete length of a barrel, which accommodates the twin screws employed in extruder systems. Each barrel section further has additional elements to cater various functional requirements. For instance, for heating the work material, a heating element may be introduced in the barrel section. In another barrel section, a hopper may be provided to input additional raw material. Typical barrel sections are cylindrical and have circular cross section. However, barrel sections with rectangular and other cross sections are also widely used.

Barrel assembly: Barrel assembly is an assembly of barrel sections aligned and joined together to form a complete length of the barrel.

A barrel section in a barrel assembly can be used in a twin-screw extruder. However, it would be apparent to a person skilled in the art that the barrel assembly would include but not limited to single-screw extruders and multi-screw extruders.

According to an aspect, a barrel alignment structure for extruder barrel sections is disclosed. The alignment structure comprises of a plurality of alignment pins and a number of corresponding slots wherein each slot is configured to receive an alignment pin.

Figure 1:
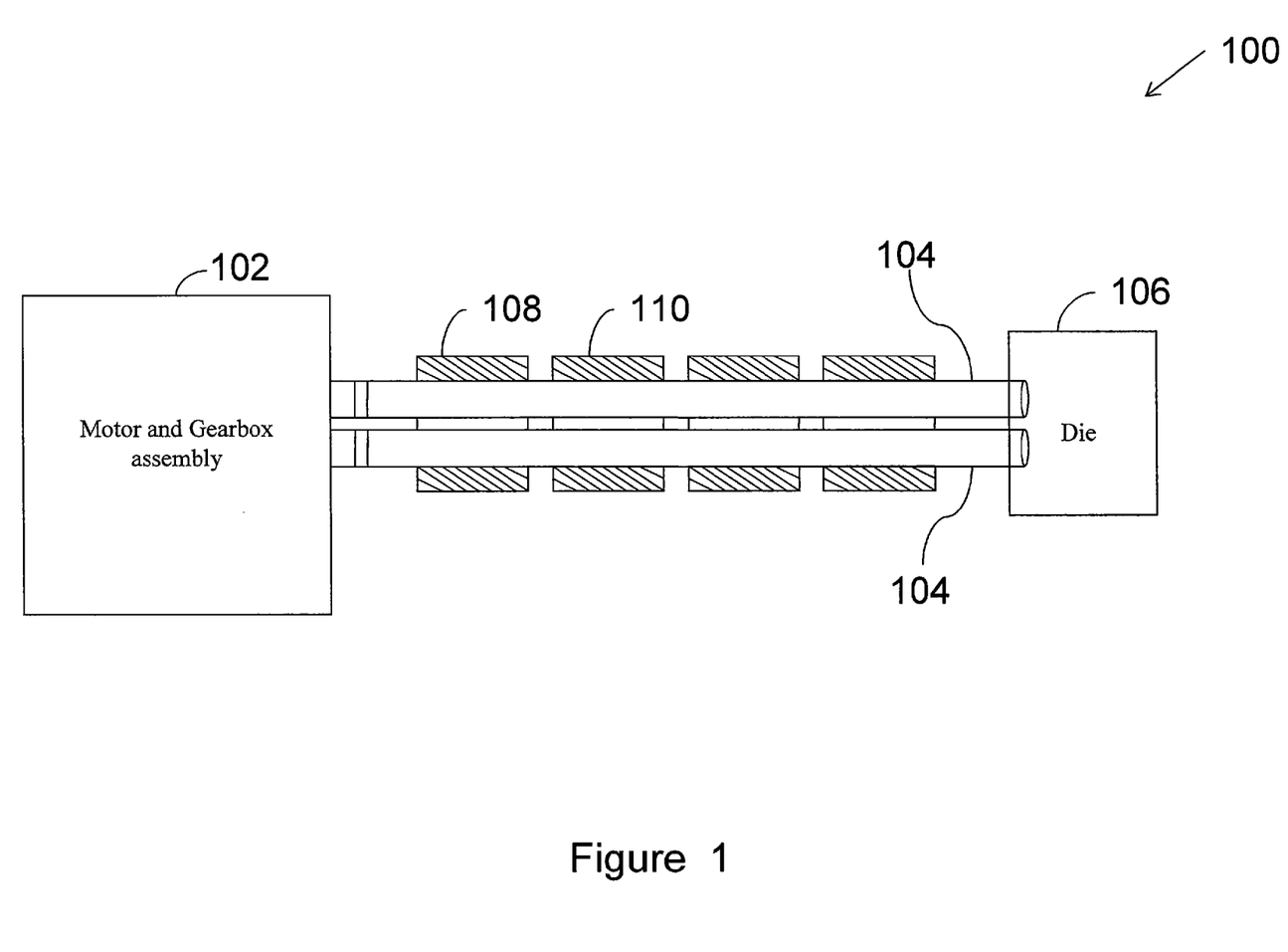
FIG. 1 is a schematic illustration of a disclosed embodiment.

FIG. 1 is a schematic illustration of an environment for implementation of the alignment structure in accordance with a disclosed embodiment. FIG. 1 shows a twin screw extruder 100 as the environment comprising a driving assembly 102 having a motor and a gearbox. Driving assembly 102 performs the task of transmitting power to pair of extruder screw shafts 104. Pair of extruder screw shafts 104 further comprises processing elements such as extruder screw elements. Pair of extruder screw shafts 104 along with extruder screw elements rotate and process the work material within the barrel assembly. The barrel assembly comprises a plurality of barrel sections: first barrel section 108, second barrel section 110 and subsequent barrel sections (not numbered) as shown in FIG. 1. The processed work material is further utilized in Die 106 to obtain desired product. For proper processing of work material and for safety of pair of extruder screw shafts 104, various barrel sections are joined with perfect alignment. The various barrel sections are joined in such a way first barrel section 108, second barrel section 110 and subsequent barrel sections remain aligned perfectly in case of unequal heating and differential expansions of the barrel sections. To ensure alignment of the barrel sections alignment pins and slots as discussed in detail in conjunction with FIGS. 2 and 3 are used.

Figure 2:
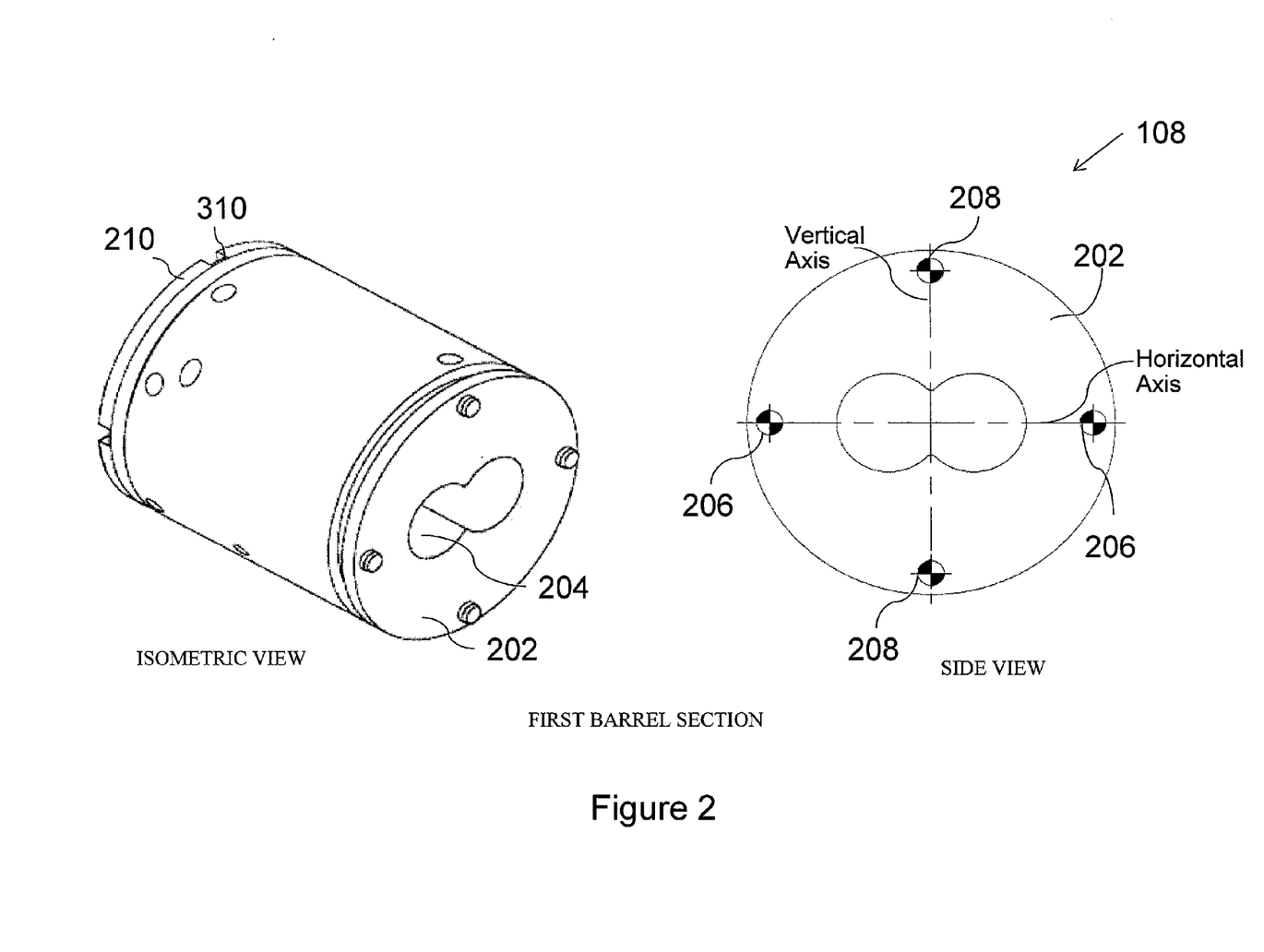
FIG. 2 is an isometric view and side view of a barrel section with alignment pins.
Figure 3:
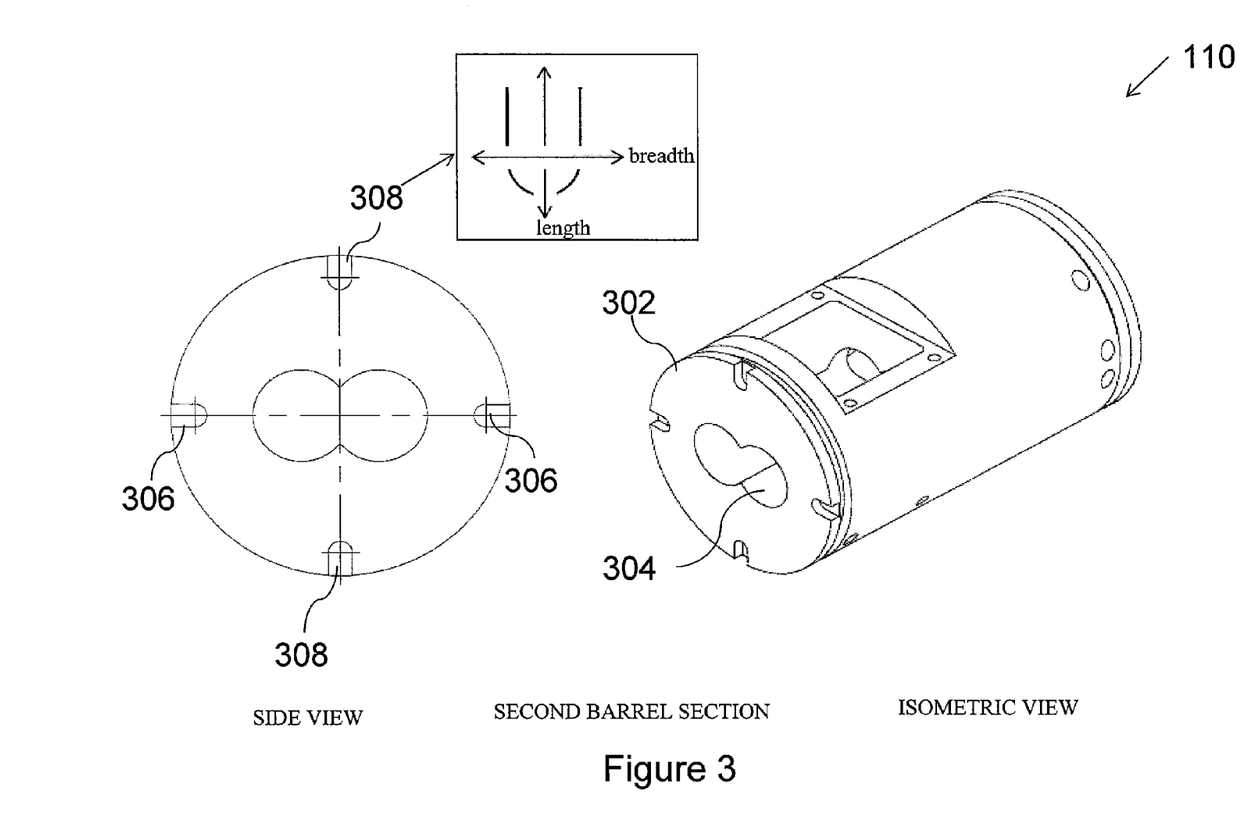
FIG. 3 is an isometric view and side view of a barrel section with slots machined on it.

FIGS. 2 and 3 depict the two end surfaces of a pair of barrel sections that are configured to abut each other. FIG. 2 illustrates the first barrel section 108 with end surface 202. A pair of horizontal alignment pins 206 along the horizontal axis of the barrel section and a pair of vertical alignment pins 208 along the vertical axis of the barrel section, collectively alignment pins, are fixed on the end surface 202. The plurality of alignment pins can be fixed on the end surface 202 by means of screwing in the threads on the first end 202, welding on the first end 202 or any other joining means known in the art. The alignment pins shown in FIG. 2 are cylindrical. However, alignment pins with tapering end, rectangular shape or any other cross section can be used in other embodiments.

As shown in the FIG. 2, first barrel section 108 further comprises bore 204. Bore 204 is formed by intersection of two parallel circular bores. Bore 204 houses pair of extruder screw shafts 104. The work material is processed by pair of extruder screw shafts 104 in bore 204. Further processing of work material takes place in second barrel section, which is described in the following paragraph with reference to FIG. 3.

Figure 5:
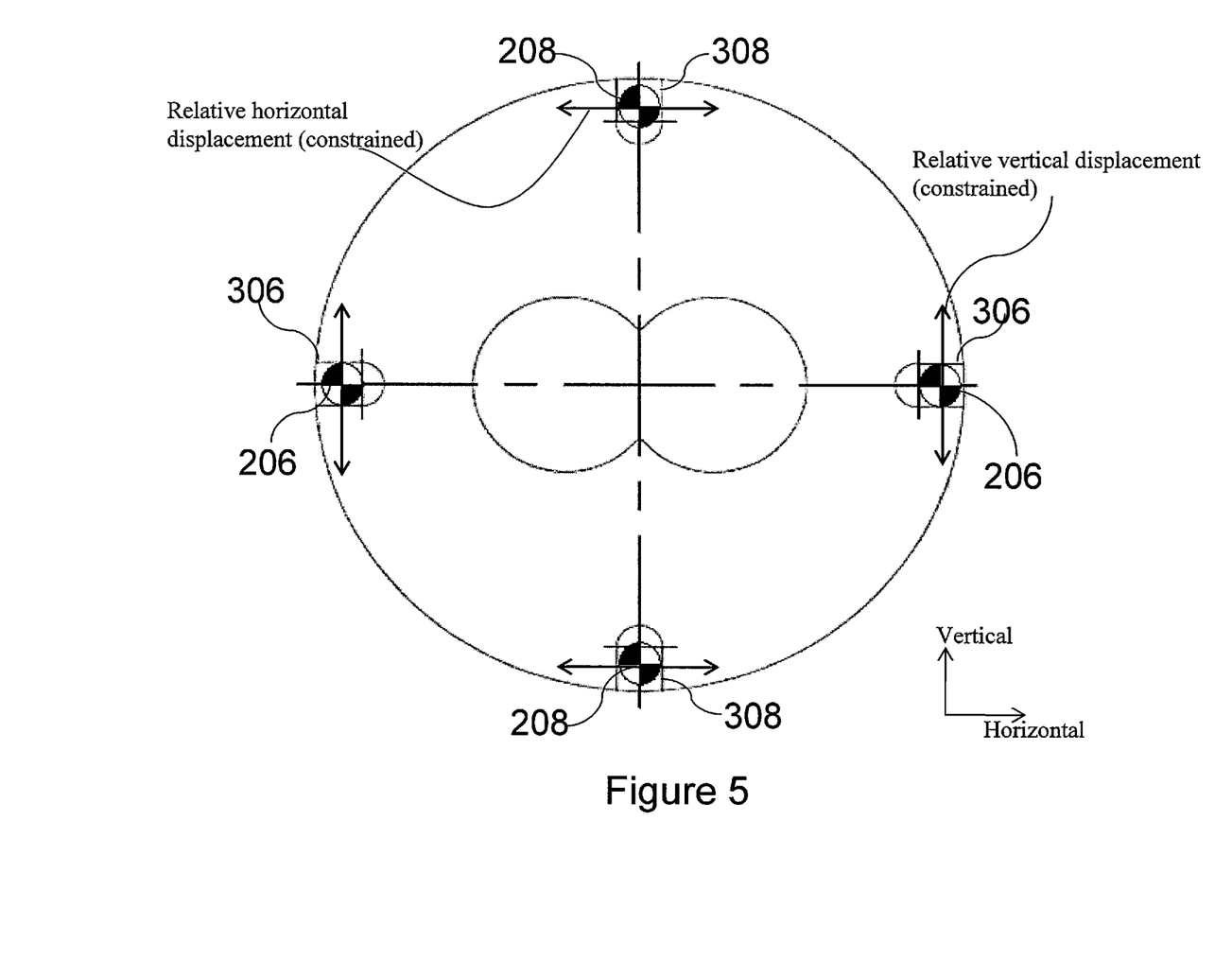
FIG. 5 depicts the utility of preventing the relative displacement of barrel sections.

FIG. 3 illustrates the second barrel section 110 defining an end surface 302. End surface 302 is configured to abut the end surface 202 of first barrel section 108. Bore 204 of first barrel section 108 has its axis perfectly aligned with that of bore 304 of second barrel section 110. A pair of horizontal slots 306 and pair of vertical slots 308 (collectively slots) is machined on the end surface 302. The plurality of slots is machined by methods like milling, grinding and other machining means available in the art. The slot is dimensioned proportional to the alignment pin to be received by it. The dimensions of the slots are configured to accommodate relative thermal expansion between the pair of barrel sections. The width of the slot is substantially equal to that of the alignment pin to be received by it so as to prevent any relative movement between the barrel sections in one direction. The length of the slot is larger than the width of the alignment pin so as to permit relative thermal expansion between the barrel sections in one direction. Referring to FIG. 5, the horizontal alignment pins 206 are capable of movement along the slot length. However, movement of the horizontal alignment pins 206 along the breadth of corresponding slot 306 is constrained. Similarly, the vertical slots 308 allow thermal expansion of pair of vertical alignment pins 208 along its length. However, movement of each of pair of vertical alignment pins 208 along the breadth of corresponding vertical slot 308 is constrained.

Referring back to FIG. 2, the barrel section may have alignment pins on one end surface and a plurality of slots on the other end surface. The first extruder barrel section 108 also defines a second end surface 210 also configured to abut the end surface of another extruder barrel section. The second end surface defines a plurality of slots 310 each configured to receive an alignment pin, wherein the slot has a width substantially equal to that of the alignment pin and a length larger than the width of the alignment pin.

Figure 4:
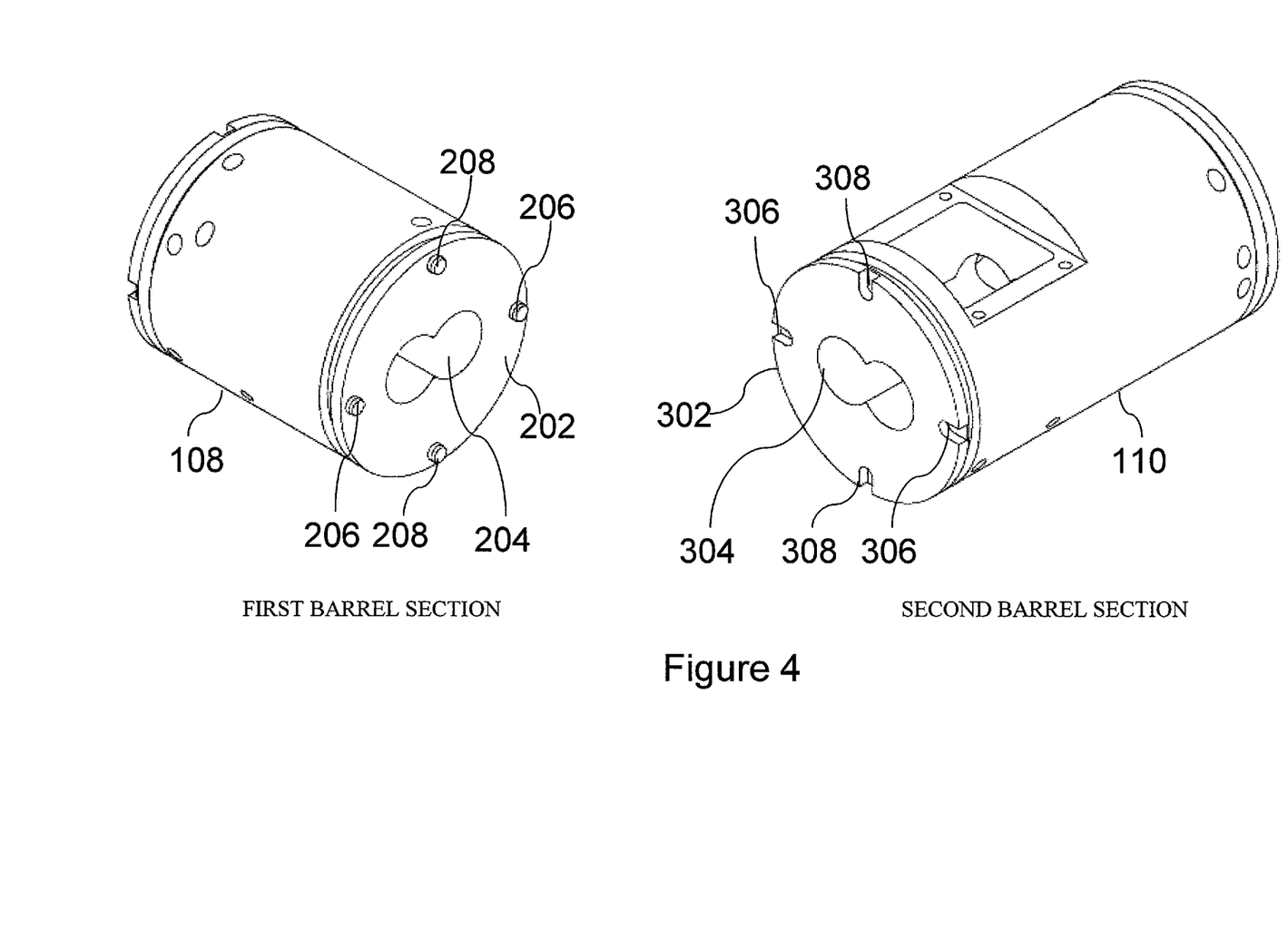
FIG. 4 depicts a pair of barrel sections with alignment pins on one barrel section and slots on another.

FIG. 4 depicts a pair of barrel sections, first barrel section 108 and second barrel section 110, with their end surfaces configured to abut each other. Alignment pins 206 fixed on end surface 202 are configured to be received by horizontal slots 306 machined on end surface 302. Vertical alignment pins 208 fixed on end surface 202 are configured to be received by vertical slots 308 machined on end surface 302. During operation, the work material is initially processed by a set of extruder screw elements present on pair of extruder screw shafts 104 in bore 204 of first barrel section 108. Then the work material enters bore 304 of second barrel section 110 for further processing by another or similar set of extruder screw elements. Different temperatures and variable forces on each barrel section tend to misalign the pair of barrel sections. Any such displacement would result in misalignment of bore 204 and bore 304. This misalignment is prevented by the alignment structure including the alignment pins and slots.

Preventing misalignment of the pair of barrel sections in case of differential force distribution and differential thermal expansions is explained with reference to FIG. 5 and FIG. 6 respectively.

FIG. 5 depicts the methodology in which a disclosed embodiment prevents relative displacement of the pair of barrel sections in conditions of differential force distributions. FIG. 5 shows end surface 302 of second barrel section 110 engaged with end surface of first barrel section 108. The plurality of alignment pins of first barrel section 108 are represented by shaded circles. As depicted in FIG. 5, the plurality of alignment pins engages with their corresponding slots. During the operation of twin screw extruder 100, the work material is subjected to different processes in different barrel sections. Hence, the different barrel sections experience unequal force distributions. As a result, first barrel section 108 (not shown in FIG. 5) tends to displace in horizontal as well as in vertical direction with respect to second barrel section 110, as represented by double headed arrows. Pair of vertical slots 308 prevents horizontal displacement of pair of vertical alignment pins 208. Hence, the horizontal motion of first barrel section 108 with respect to second barrel section 110 is prevented by pair of vertical grooves 308. Similarly, pair of horizontal slots 306 prevents vertical displacement of pair of horizontal alignment pins 206. Hence, the vertical displacement of first barrel section 108 with respect to second barrel section 110 is prevented.

Figure 6:
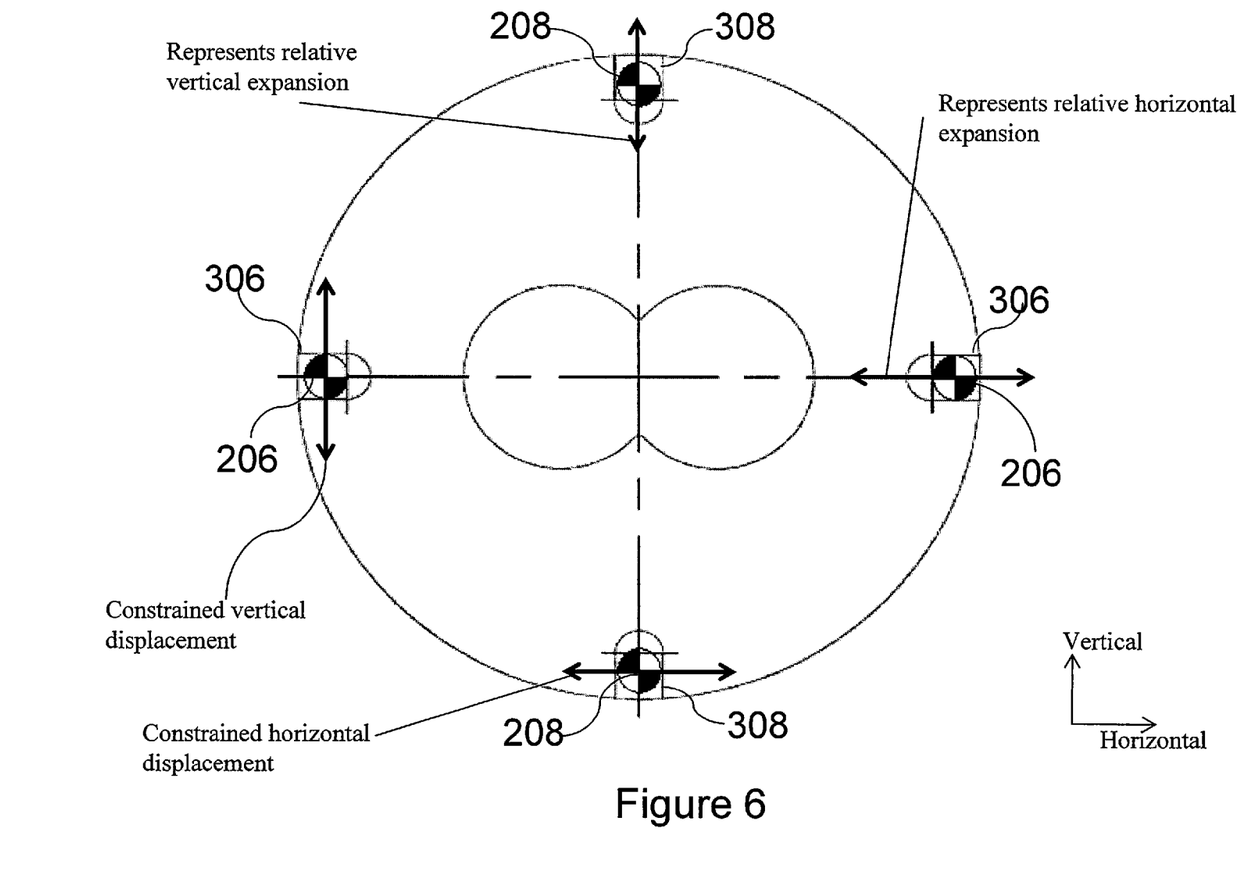
FIG. 6 depicts the alignment of the barrel sections in case of differential thermal expansion.

FIG. 6 depicts the methodology in which a disclosed embodiment prevents relative displacement of the pair of barrel sections in conditions of differential thermal expansion. FIG. 6 shows pair of horizontal alignment pins 206 engaged with pair of horizontal slots 306. Similarly, pair of vertical alignment pins 306 is engaged with pair of vertical slots 308. During the operation of a disclosed embodiment, first barrel section 108 and second barrel section 110 are subjected to different temperature conditions. Hence, first barrel section 108 and second barrel section 110 undergo differential thermal expansion. For the sake of simplicity, the embodiments are explained from the frame of reference of second barrel section 110. In this frame of reference, second barrel section 110 does not undergo any thermal expansion. However, first barrel section 108 undergoes thermal expansion to the extent of difference in thermal expansions between first barrel section 108 and second barrel section 110. This expansion of first barrel section 108 with respect to second barrel section 110 is referred to as relative thermal expansion. The relative thermal expansion in vertical direction is represented by double headed vertical arrow in FIG. 6. During the relative thermal expansion of first barrel section 108, each of pair of horizontal alignment pins 206 thermally expands along the length of pair of horizontal slots 306. Due to symmetry of the barrel section, each of pair of horizontal alignment pins 206 thermally expands to same extent along the length of corresponding horizontal groove 306. Hence, the horizontal position of the axis of first barrel section 108 remains intact with respect to that of second barrel section 110. Similarly, each of pair of vertical alignment pins 208 also thermally expands along the length of pair of vertical slots 308. Each of pair of vertical alignment pins 208 thermally expands to same extent along the length of corresponding vertical slot 308. Hence, the vertical position of the axis of first barrel section 108 remains intact with respect to that of second barrel section 110. Therefore, the horizontal and vertical positions of the axis of first barrel section 108 remains intact with respect to second barrel section 110. Hence, first barrel section 108 and second barrel section 110 remains aligned despite the differential thermal expansion. Further, since the described embodiment allows for unconstrained thermal expansion, no residual stresses are formed in barrel section 108 and barrel section 110. Hence, the alignment of the barrel sections is created without any stress formation.

The embodiments have been explained using alignment pins and grooves in only horizontal and vertical direction for the sake of simplicity. These horizontal and vertical alignment pins are diametrically opposite along the axes of the barrel section. The alignment pins are preferably symmetrically distributed along the end surface of the barrel section. The alignment pins and the corresponding slots are preferably even in number and distributed in pairs diametrically opposite each other.

However, the embodiments are not limited to alignment pins and slots along the horizontal and vertical axis of the barrel section. A disclosed embodiment that employs alignment pins and slots in directions other than along horizontal and vertical axis is described below.

Figure 7:
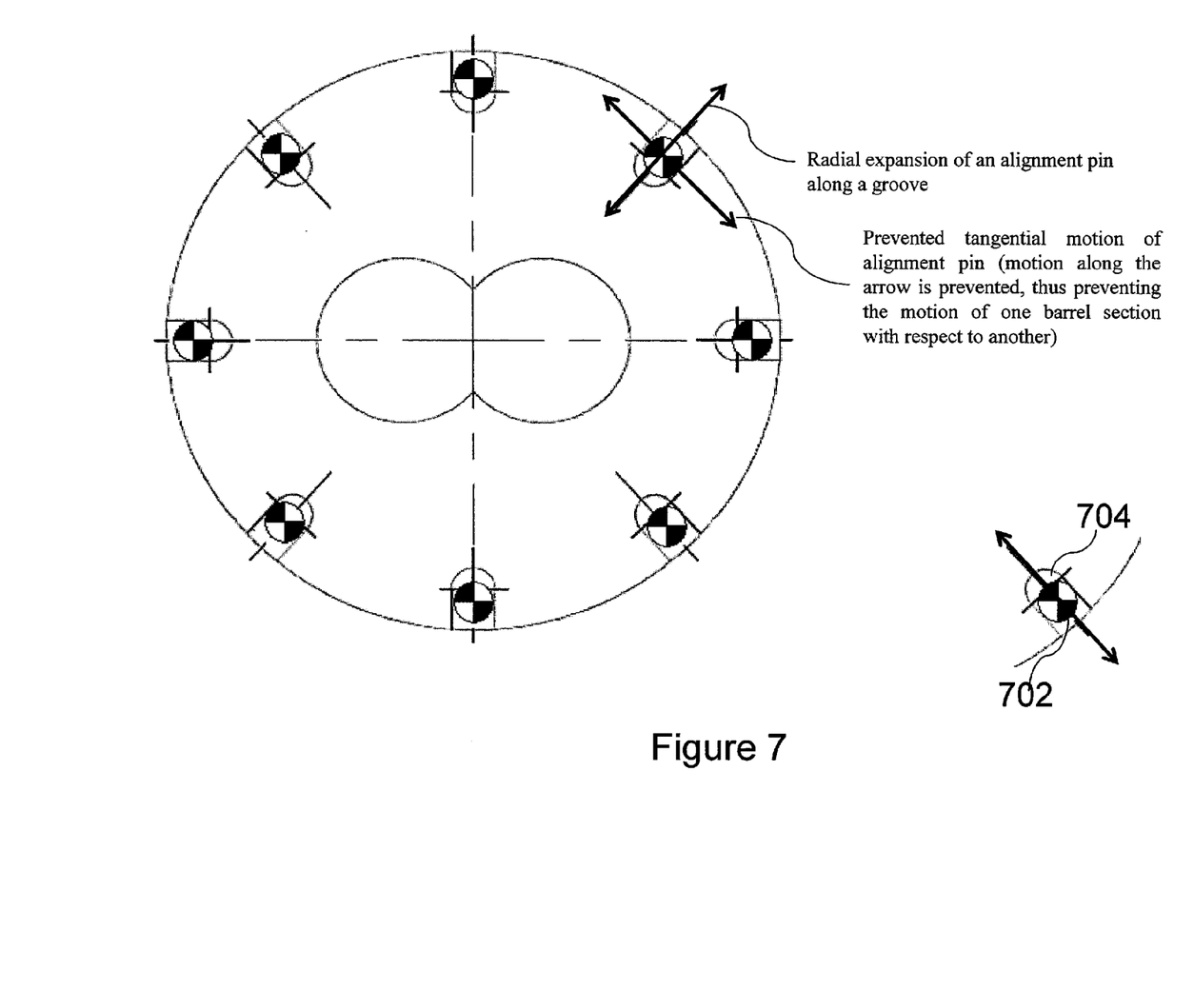
FIG. 7 depicts an embodiment that employs alignment pins and slots uniformly distributed at positions other than axial positions.

FIG. 7 depicts a disclosed embodiment that has two barrel sections (not shown in FIG. 7). One of the barrel sections has a plurality of alignment pins fixed at angles to the horizontal and vertical axis of the barrel sections. The second barrel section has plurality of slots machined at positions such that the plurality of slots accommodates the plurality of alignment pins. FIG. 7 also shows a zoomed in view of alignment pin 702 engaged with slot 704. Alignment pin 702 represents each of the plurality of alignment pins. Slot 704 represents each of the plurality of slots. As explained in the description of FIG. 6, in case of differential thermal expansion between the barrel sections, alignment pin 702 thermally expands along the length of slot 704 as represented by double headed arrow shown in FIG. 7. Similarly, each of plurality of alignment pins thermally expands along the length of corresponding groove. As a result, unconstrained relative thermal expansion of the barrel sections takes place. Further, the alignment of the barrel sections remains undisturbed.

Further, the embodiments are not limited to barrel sections with circular cross sections. The barrel sections may have any given cross section. The embodiments are explained in the following Paragraph referring to barrel sections with rectangular cross section in conjunction with FIG. 8.

Figure 8:
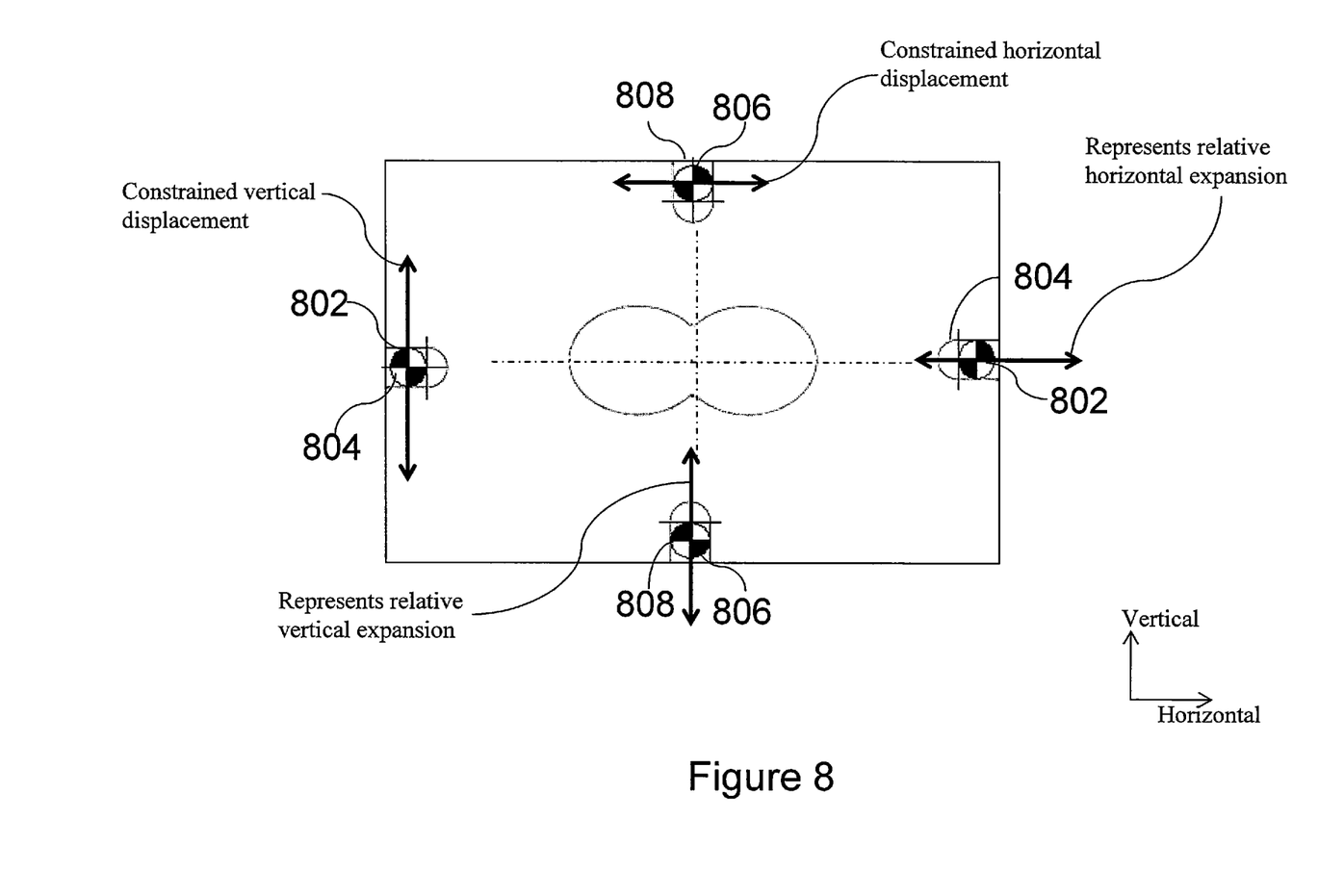
FIG. 8 depicts an embodiment in rectangular barrel sections.

FIG. 8 depicts the utility in preventing misalignment of rectangular cross section barrel sections in a disclosed embodiment. FIG. 8 depicts pair of horizontal alignment pins 802 engaged with pair of horizontal slots 804. Similarly, pair of vertical alignment pins 806 engaged with pair of vertical slots 808 is shown. As in the case of barrel sections with circular cross sections, different barrel sections undergo different temperature conditions. Hence, the barrel sections undergo differential thermal expansion. As explained in the description of FIG. 6, the embodiments are explained from the frame of reference of the barrel section with slots machined on it. When thermal expansion takes place, pair of horizontal alignment pins 802 thermally expands along the length of pair of horizontal slot 804. Similarly, pair of vertical alignment pins 806 thermally expands along the length of pair of vertical slot 808. However, pair of horizontal alignment pins 804 prevents displacement of horizontal alignment pins 802 in vertical direction. Similarly, pair of vertical alignment pins 804 prevents displacement of vertical alignment pins 806 in horizontal direction. As a result of the described arrangement, the alignment of the barrel sections is maintained despite the differential thermal expansion and unequal force distributions.

In the embodiments described, the slots are shown to be present proximate the edge of the end surface of the barrel section. Specifically the slots are shown on the circumference of a barrel section for the sake of simplicity in explanation. However, the embodiments can be carried out with the slot present on the interior of the end of the barrel section. The slots may also be configured to receive the alignment pin with clearance there between on both sides along the length of the slot, as illustrated in FIG. 5.

The embodiments also provide for an extruder comprising a plurality of barrel sections as described with reference to FIGS. 2 to 8.

INDUSTRIAL APPLICABILITY

A barrel alignment structure for a pair of barrels each defining an end surface configured to abut each other comprising a plurality of alignment pins distributed on the end surface of the first barrel section and a corresponding number of slots defined on the end surface of the second barrel section, each slot configured to receive one alignment pin, wherein the slot has a width substantially equal to that of the alignment pin and a length larger than the width of the alignment pin permitting relative thermal expansion between the pair of barrels.

Such barrel alignment structure(s), wherein the alignment pins are proximate the edge of the end surface of the barrel section.

Such barrel alignment structure(s), wherein the alignment pins are symmetrically distributed on the end surface of the barrel section.

Such barrel alignment structure(s), comprising an even number of alignment pins, wherein the alignment pins are positioned in pairs diametrically opposite each other.

Such barrel alignment structure(s), wherein the slot is configured to receive the alignment pin with clearance there between on both sides along the length of the slot.

Such barrel alignment structure(s), wherein the alignment pins and the corresponding slots are positioned along the horizontal and vertical axis of the barrel section.

An extruder barrel section defining an end surface configured to abut the end surface of another extruder barrel section comprising a plurality of alignment pins distributed on the end surface of the barrel section; each alignment pin configured to be received by a corresponding slot defined on the end surface of the extruder barrel section abutting it, wherein the slot has a width substantially equal to that of the alignment pin and a length larger than the width of the alignment pin permitting relative thermal expansion between the pair of barrels.

Such extruder barrel section(s), wherein the alignment pins are proximate the edge of the end surface of the barrel.

Such extruder barrel sections(s), wherein the alignment pins are symmetrically distributed on the end surface of the barrel.

Such extruder barrel section(s), comprising an even number of alignment pins, wherein the alignment pins are positioned in pairs diametrically opposite each other.

Such extruder barrel section(s), defining a second end surface also configured to abut the end surface of another extruder barrel, wherein the second end surface defines a plurality of slots each configured to receive an alignment pin, wherein the slot has a width substantially equal to that of the alignment pin and a length larger than the width of the alignment pin.

Such extruder barrel section(s), wherein the slot is configured to receive the alignment pin with clearance there between on both sides along the length of the slot.

A method of aligning a pair of barrel sections each defining an end surface configured to abut each other comprising providing a plurality of alignment pins distributed on the end surface of the first barrel section and defining a corresponding number of slots on the end surface of the second barrel section, each slot configured to receive one alignment pin, wherein the slot has a width substantially equal to that of the alignment pin and a length larger than the width of the alignment pin.

The invention claimed is:

1. A pair of extruder barrel sections comprising:
    a first barrel section defining a first end surface, a plurality of alignment pins distributed on the first end surface of the first barrel section;
    a second barrel section defining a second end surface, a plurality of slots defined on the second end surface of the second barrel section, the first end surface of the first barrel section configured to abut the second end surface of the second barrel section, each alignment pin configured to be received by a corresponding slot defined on the second end surface of the second barrel section, wherein each slot has a width substantially equal to one of the alignment pins to prevent any relative movement between the first and second barrel sections in one direction, and each slot has a length larger than the width of the alignment pin, the length of each slot extending in a radial direction, and permitting relative thermal expansion between the first and second barrel sections in another direction;
    the first and second barrel sections each defining at least one bore and having at least one screw shaft extending therethrough, each pin being fixed on the first end surface and terminating within one of the slots.

2. The pair of extruder barrel sections as claimed in claim 1 wherein the alignment pins are proximate to an edge of the first end surface of the first barrel section.

3. The pair of extruder barrel sections as claimed in claim 1 wherein the alignment pins are symmetrically distributed on the first end surface of the first barrel section.

4. The pair of extruder barrel sections as claimed in claim 1 further comprising an even number of alignment pins, wherein the alignment pins are positioned in pairs diametrically opposite each other.

5. The pair of barrel sections as claimed in claim 1 wherein the first and second barrel sections are coupled to an extruder.

6. The pair of extruder barrel sections of claim 1 wherein the pins are free to move lengthwise within their respective slots during operation of the barrel sections.

7. The pair of extruder barrel sections of claim 1 wherein each barrel section has a bore formed by intersection of two circular parallel bores.

8. The pair of extruder barrel sections of claim 1 where the pins are fixed on the first end surface by welding.

9. The pair of extruder barrel sections of claim 1 wherein the pins are fixed on the first end surface by threaded engagement with the first surface.

* * * * *